(12) United States Patent
Hoerschler et al.

(10) Patent No.: US 11,180,001 B2
(45) Date of Patent: Nov. 23, 2021

(54) AIR VENT AND METHOD FOR INTRODUCING AIR INTO AN AREA

(71) Applicant: Bayerische Motoren Werke Aktiengesellschaft, Munich (DE)

(72) Inventors: Ingolf Hoerschler, Munich (DE); Anna Rahm, Munich (DE); Stefan Zemsch, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 228 days.

(21) Appl. No.: 15/828,871

(22) Filed: Dec. 1, 2017

(65) Prior Publication Data

US 2018/0079282 A1 Mar. 22, 2018

Related U.S. Application Data

(63) Continuation of application No. PCT/EP2016/061633, filed on May 24, 2016.

(30) Foreign Application Priority Data

Jun. 3, 2015 (DE) ..................... 10 2015 210 258.0

(51) Int. Cl.
*B60H 1/34* (2006.01)

(52) U.S. Cl.
CPC ..................... *B60H 1/345* (2013.01)

(58) Field of Classification Search
CPC ....................................... B60H 1/345

(Continued)

(56) References Cited

U.S. PATENT DOCUMENTS 3,832,939 A * 9/1974 Kakei .................... B60H 1/345
454/125
4,570,533 A 2/1986 Sugawara et al.
(Continued)

FOREIGN PATENT DOCUMENTS

CN 1759020 A 4/2006
DE 34 37 259 C2 3/1989
(Continued)

OTHER PUBLICATIONS

German-language Search Report issued in counterpart German Application No. 10 2015 210 258.0 dated Nov. 19, 2015 with partial English translation (12 pages).
(Continued)

*Primary Examiner* — Allen R Schult
(74) *Attorney, Agent, or Firm* — Crowell & Moring LLP

(57) ABSTRACT

An air vent is provided for directly introducing air into a passenger compartment of a vehicle. The air vent has at least one outlet opening and at least one deflecting surface which is arranged in the region of the outlet opening, which runs radially outwards with respect to a flow direction of the air flowing in the direction of the deflecting surface, and by which the air flowing in the direction of the deflecting surface can be deflected radially outwards using the Coanda affect. An intuitively controllable and inexpensively producible air vent is achieved in that the shape and arrangement of the deflecting surface is adapted to a flow speed of the air flowing in the direction of the deflecting surface such that it is equally probable that the air flowing in the direction of the deflecting surface is deflected radially outwards by the deflecting surface or it is not.

6 Claims, 2 Drawing Sheets

(58) Field of Classification Search
 USPC .......................................................... 454/155
 See application file for complete search history.

(56) References Cited

U.S. PATENT DOCUMENTS

| | | | |
|---|---|---|---|
| 5,340,358 A | 8/1994 | Halupczok et al. | |
| 6,792,976 B2 | 9/2004 | Butera et al. | |
| 7,604,533 B2 * | 10/2009 | Ogura .................. | B60H 1/3421 454/143 |
| 2003/0168114 A1 | 9/2003 | Butera et al. | |
| 2006/0172677 A1 | 8/2006 | Ryu | |
| 2009/0298412 A1 | 12/2009 | Gehring et al. | |
| 2016/0236541 A1 | 8/2016 | Gruenbeck et al. | |

FOREIGN PATENT DOCUMENTS

| | | | | |
|---|---|---|---|---|
| DE | 10 2008 005 985 A1 | 9/2008 | | |
| DE | 10 2009 051 809 A1 | 5/2011 | | |
| DE | 10 2013 111 175 B3 | 9/2014 | | |
| EP | 1 580 053 A1 | 9/2005 | | |
| EP | 1707893 A1 * | 10/2006 | ............. | F24F 13/06 |
| JP | 2003-276431 A | 9/2003 | | |
| JP | 2003276431 A * | 9/2003 | ........... | B60H 1/3414 |
| JP | 2005-350029 A | 12/2005 | | |

OTHER PUBLICATIONS

International Search Report (PCT/ISA/210) issued in PCT Application No. PCT/EP2016/061633 dated Oct. 6, 2016 with English translation (7 pages).
German-language Written Opinion (PCT/ISA/237) issued in PCT Application No. PCT/EP2016/061633 dated Oct. 6, 2016 (6 pages).
English translation of Chinese Office Action issued in counterpart Chinese Application No. 201680031618.1 dated Sep. 4, 2019 (10 pages).

* cited by examiner

AIR VENT AND METHOD FOR INTRODUCING AIR INTO AN AREA

CROSS REFERENCE TO RELATED APPLICATIONS

This application is a continuation of PCT International Application No. PCT/EP2016/061633, filed May 24, 2016, which claims priority under 35 U.S.C. § 119 from German Patent Application No. 10 2015 210 258.0, filed Jun. 3, 2015, the entire disclosures of which are herein expressly incorporated by reference.

BACKGROUND AND SUMMARY OF THE INVENTION

The invention relates to an air vent for the direct introduction of air into a passenger compartment of a vehicle, having at least one outlet opening and at least one deflecting face which is arranged in the region of the outlet opening, runs radially to the outside with regard to a flow direction of the air which flows in the direction of the deflecting face, and by way of which the air which flows in the direction of the deflecting face can be deflected radially to the outside with utilization of the Coanda effect.

In addition, the invention relates to an air vent for the direct introduction of air into a passenger compartment of a vehicle, having at least one outlet opening and at least one variably adjustable air guiding construction which is arranged in the region of the outlet opening.

Furthermore, the invention relates to a method for the direct introduction of air into a passenger compartment of a vehicle, the air being introduced directly into the passenger compartment via at least one air vent which has at least one outlet opening and at least one deflecting face which is arranged in the region of the outlet opening, runs radially to the outside with regard to a flow direction of the air which flows in the direction of the deflecting face, and by way of which the air which flows in the direction of the deflecting face can be deflected radially to the outside with utilization of the Coanda effect.

Furthermore, the invention relates to a method for the direct introduction of air into, in particular, a passenger compartment of a vehicle, the air being introduced directly into the passenger compartment via at least one air vent which has at least one outlet opening and at least one variably adjustable air guiding construction which is arranged in the region of the outlet opening.

Air vents are used in conjunction with different types of air conditioning systems or ventilation systems, in order for it to be possible to introduce air into a space. For example, in the case of an air conditioning system of a vehicle, temperature-controlled and dried air is introduced into a passenger compartment of the vehicle via air vents.

Air vents as a rule provide various setting possibilities. For example, a direction of an air jet which flows out of an air vent can be set. To this end, an air vent can be equipped with a louver construction, in particular a louvered grill, which makes a variable air deflection possible by way of louvers which can be pivoted or can be moved in some other way.

A louver construction is a mechanical precision construction which is relatively complicated and therefore expensive both in the production and in assembly. In addition, the louvers act as aerodynamic resistances or disruptive bodies in the air flow. In comparison with an undisruptive air flow, this results both in an increased flow and pressure loss and in a considerable impairment of the acoustics as a result of noise development. The deflection of the flow is relatively limited as a result of a physically induced flow separation on the louvers in the case of large angular positions.

An air vent without a louver construction is known, for example, from DE 10 2013 111 175 B3. This air vent includes a housing with an air outlet opening, a first connector to an air supply duct, and a continuous flow duct. The flow duct is of curved configuration at least on two opposite sections, in such a way that the cross section of the flow duct increases toward the air outlet opening. The at least two sections comprise openings which open in each case into a chamber which lies behind the sections. The chambers have in each case one second connector which is separate from the first connector for feeding in or discharging air in order to generate positive pressure and/or negative pressure. The air which flows in the direction of the respective section can be deflected radially to the outside by way of the curved sections with utilization of the Coanda effect. By way of the generation of the positive pressure or negative pressure, the flow direction of the air jet which flows out of the air vent can be varied.

It is an object of the invention to provide an air vent which can be operated in a relatively intuitive manner and can be produced relatively inexpensively.

This and other objects are achieved by way of a air vent and method of operating same in accordance with embodiments of the invention.

An air vent according to the invention for the direct introduction of air into a passenger compartment of a vehicle comprises at least one outlet opening and at least one deflecting face which is arranged in the region of the outlet opening, runs radially to the outside with regard to a flow direction of the air which flows in the direction of the deflecting face, and by way of which the air which flows in the direction of the deflecting face can be deflected radially to the outside with utilization of the Coanda effect. A shape and an arrangement of the deflecting face are adapted to a flow speed of the air which flows in the direction of the deflecting face such that it is equally probable whether the air which flows in the direction of the deflecting face is deflected radially to the outside or not by way of the deflecting face.

The deflecting face of the air vent according to the invention is configured and arranged in such a way that a meta-stable state is configured, in which it is firstly equally probable whether the air which flows in the direction of the deflecting face is deflected radially to the outside or not by way of the deflecting face, and in which secondly an air jet which is deflected or not deflected by way of the deflecting face is stable without external disruptions.

If, for example, the non-deflected air jet is set in a stable manner during operation of the air vent, an object, for example a hand of a person or an article, can be held in the non-deflected air jet in the region of the air vent in such a way that the air jet jumps into its next stable state in the form of the deflected air jet, and vice versa. The air vent according to the invention can therefore be operated very intuitively and directly in contrast to conventional solutions.

The invention utilizes the Coanda effect which is known in fluid physics, in order for it to be possible for the air which flows in the direction of the deflecting face to be deflected according to the invention. In accordance with the Coanda effect, a gas jet or a liquid flow has the tendency to flow along a convex surface, instead of separating from the convex surface and moving further in the original flow direction.

Tests have shown that different states are formed for different deflecting angles. If, for example, the deflecting angle is smaller than a minimum deflecting angle, the Coanda effect is observed, which means that the air which flows in the direction of the deflecting face bears tightly against the deflecting face, with the result that the air which flows in the direction of the deflecting face is deflected in comparison with its original flow direction. There is then exclusively the deflected air jet. If the deflecting angle lies between the minimum deflecting angle and a maximum deflecting angle, the meta-stable state which is used within the context of the invention is set, in which state, depending on the ambient conditions, either the deflected air jet or, with a great probability, the non-deflected air jet is configured in a stable manner. If the deflecting angle is greater than the maximum deflecting angle, the air which flows in the direction of the deflecting face is not deflected, with the result that the air which flows in the direction of the deflecting face moves further in its original flow direction. The minimum deflecting angle and the maximum deflecting angle are influenced by various parameters, such as the surface condition, in particular the roughness, of the deflecting face, the flow speed of the air which flows in the direction of the deflecting face, and the like, and can be determined experimentally, for example. In accordance with the invention, the deflecting angle is adapted by way of the shape and arrangement of the deflecting face to the flow speed of the air which flows in the direction of the deflecting face in such a way that it is equally probable whether the air which flows in the direction of the deflecting face is deflected radially to the outside or not by way of the deflecting face. According to the invention, the deflecting angle therefore lies between the minimum deflecting angle and the maximum deflecting angle. In order to achieve the effect according to the invention, the shape and the arrangement of the deflecting face can additionally be adapted to at least one further parameter.

The air vent according to the invention can be configured completely without mechanical air guiding elements, with the result that the setting of the flow direction of the air jet which is output by the air vent is possible without mechanical air guiding elements and without pressure loading in accordance with DE 10 2013 111 175 B3. The air vent according to the invention can thus be produced with less complexity and therefore less expensively than conventional air vents of this type. Since there are no mechanical air guiding elements or aerodynamic disruptive bodies in the air flow, an increased flow and pressure loss and an impairment of the acoustics as a result of the development of noise on mechanical air guiding elements, as is conventionally the case, do not occur. Without mechanical and movable air guiding elements and the associated precision mechanism, the air vent according to the invention is considerably more robust and functionally reliable than an air vent having air guiding elements of this type. As a result, the number of possibly required repairs is reduced considerably. An omission of mechanical air guiding elements additionally leads to new freedoms for the design of the air vent according to the invention.

The air vent according to the invention can also have two or more corresponding deflecting faces, in order for it to be possible to selectively set three or more flow directions of the air which exits from the air vent by way of the air vent.

The air vent according to the invention can be used for the direct introduction of temperature-controlled and/or dried air into a passenger compartment of a vehicle.

In accordance with one advantageous refinement, the deflecting face is of at least partially convex or planar configuration. Both refinements make the occurrence of the Coanda effect possible. The deflecting face can also be of completely convex or planar configuration.

A further advantageous refinement provides that the deflecting face is formed at least partially by a component which is produced at least partially from an intelligent material in such a way that it changes its shape and, as a result, the shape of the deflecting face if it is loaded with an electric voltage. An intelligent material is also called a "smart material". As has already been mentioned above, the minimum deflecting angle and the maximum deflecting angle are dependent on the flow speed of the air which flows in the direction of the deflecting face. The same otherwise applies to a radius between a deflecting face of planar configuration and an adjoining section of the air vent, which section is connected upstream in the flow direction of the air. The deflecting angle of the air, and possibly said radius, therefore have to be adapted in the case of varying fan stages and/or associated different flow speeds of the air, in order to ensure optimum operation of the air vent for all flow speeds of the air and in order for it to be possible to set the meta-stable state for all flow speeds of the air. This can be achieved by virtue of the fact that the deflecting face, possibly also in the region of the radius, is formed by a component which is produced at least partially from an intelligent material in such a way that it changes its shape and, as a result, the shape of the deflecting face if it is loaded with an electric voltage. In particular, the deflecting angle of the air can be varied by way of the change of the shape of the component.

According to a further advantageous refinement, the air vent comprises at least one flow duct which has at least one inflow section which can be connected to an air supply and at least one outflow section which is connected to said inflow section, adjoins the outflow opening, and on which the outflow opening is arranged, the deflecting face being arranged on the outflow section in such a way that the flow duct is widened toward the outlet opening in the region of the deflecting face. In accordance with this refinement, the air vent manages without mechanical air guiding elements, which is associated with the abovementioned advantages.

The flow duct advantageously has at least one air duct which is arranged longitudinally displaceably within the inflow section. The flow direction of the air which flows out of the air vent can be varied in an infinitely variable manner by way of the longitudinal displacement of the air duct in the inflow section. If the air duct is displaced away from the outflow section, a maximum deflection of the air which flows in the direction of the deflecting face is possible by means of the deflecting face. If, in contrast, the air duct is displaced in the direction of the outflow section, the air which flows in the direction of the deflecting face is not deflected by the deflecting face to such a pronounced extent, since it flows onto the deflecting face at a smaller incident flow angle.

It is advantageous, furthermore, if a flow cross section of the air duct is variable. If the flow cross section of the air duct is reduced, the flow speed of the air which flows in the air duct is increased. If, in contrast, the flow cross section of the air duct is increased, the flow speed of the air which flows in the air duct is reduced. By way of said variation of the flow speed of the air which flows in the direction of the deflecting face, said air is deflected to a different extent by means of the deflecting face. Therefore, an infinitely variable variation of the flow direction of the air which flows out of the air vent can also be realized as a result.

A further air vent according to the invention for the direct introduction of air into a passenger compartment of a vehicle comprises at least one outlet opening, at least one variably adjustable air guiding construction which is arranged in the region of the outlet opening, and at least one deflecting face which is arranged in the region of the outlet opening and runs radially to the outside with regard to a flow direction of the air which is guided in the direction of the deflecting face by means of the air guiding construction which is situated in an extreme position. A shape and an arrangement of the deflecting face are adapted to a flow speed of the air which flows in the direction of the deflecting face in such a way that the air which flows in the direction of the deflecting face can be deflected radially to the outside by way of the deflecting face with utilization of the Coanda effect.

The air vent according to the invention can have, for example, mechanical air guiding elements, in particular louvers, as an air guiding construction, by way of which the air jet can be deflected. The deflecting face adjoins the air guiding elements on the outflow side and serves, as a result, to increase a maximum deflecting angle of the air which flows out of the air vent. An increase of this type of the maximum deflecting angle of the air which flows out of the air vent can be expedient in the case of certain requirements, for example in a cabriolet. Here, the deflecting face can be used, in order to deflect at least part of the air which flows out of the air vent further downward if required. If, for example, the air which flows through the air vent is deflected downward to the maximum extent by way of the mechanical air guiding elements, part of the air flows in the direction of the deflecting face. The shape and the arrangement of the deflecting face are selected in such a way that, in their extreme position, the louvers guide the air in the direction of the deflecting face in such a way that the air is necessarily deflected radially to the outside as a result of the contact with the deflecting face with utilization of the Coanda effect. A sudden change in the deflection of the air by means of the deflecting face occurs here. Here, the Coanda effect makes a maximum deflecting angle possible which is greater than the maximum deflecting angle which can be achieved solely by way of the louvers. This effect can be controlled to a greater extent by way of defined shapes, the configuration of air flow breakaway edges, in particular spoilers, and of air-guiding bypasses.

Otherwise, at least one of the abovementioned refinements of the air vent which was described first can be realized in the case of the further air vent.

According to a method according to the invention for the direct introduction of air into a passenger compartment of a vehicle, the air is introduced directly into the passenger compartment via at least one air vent which has at least one outlet opening and at least one deflecting face which is arranged in the region of the outlet opening, runs radially to the outside with regard to a flow direction of the air which flows in the direction of the deflecting face, and by way of which the air which flows in the direction of the deflecting face can be deflected radially to the outside with utilization of the Coanda effect, a shape and an arrangement of the deflecting face being adapted to a flow speed of the air which flows in the direction of the deflecting face in such a way that it is equally probable whether the air which flows in the direction of the deflecting face is deflected radially to the outside or not by way of the deflecting face.

The advantages which are mentioned above in relation to the air vent are associated accordingly with the method. In particular, the air vent according to one of the abovementioned refinements or any desired combination thereof can be set up for carrying out the method.

In accordance with one advantageous refinement, an incident flow angle of the air which flows in the direction of the deflecting face is varied. By way of said variation of the incident flow angle, the deflecting angle of the air which is deflected by the deflecting face is varied. The incident flow angle and, as a result, the deflecting angle can be varied continuously, in particular. The variation of the incident flow angle can take place by means of an air duct which is arranged longitudinally displaceably within an inflow section of a flow duct of the air vent, as described above in conjunction with one refinement of the air vent.

According to a further advantageous refinement, a flow speed of the air which flows in the direction of the deflecting face is varied. As a result of said variation of the flow speed of the air which flows in the direction of the deflecting face, said air is deflected to a different extent by means of the deflecting face. Therefore, an infinitely variable variation of the flow direction of the air which flows out of the air vent can also be realized as a result. The variation of the flow speed of the air which flows in the direction of the deflecting space can be achieved by way of a variation of a flow cross section, in particular the flow cross section of the air duct in accordance with the above refinement of the air vent.

According to a further method according to the invention for the direct introduction of air into a passenger compartment of a vehicle, the air is introduced directly into the passenger compartment via at least one air vent which has at least one outlet opening and at least one variably adjustable air guiding construction which is arranged in the region of the outlet opening. At least one deflecting face is arranged in the region of the outlet opening, which deflecting face runs radially to the outside with regard to air which flows in the direction of the deflecting face. Air is guided in the direction of the deflecting face by means of the air guiding construction which is situated in an extreme position. A shape and an arrangement of the deflecting face are adapted to a flow speed of the air which flows in the direction of the deflecting face in such a way that the air which flows in the direction of the deflecting face is deflected radially to the outside by way of the deflecting face with utilization of the Coanda effect.

The advantages which are mentioned above in relation to the further air vent are associated accordingly with the further method. In particular, the further air vent according to one of the abovementioned refinements or any desired combination thereof can be set up to carry out the further method.

Other objects, advantages and novel features of the present invention will become apparent from the following detailed description of one or more preferred embodiments when considered in conjunction with the accompanying drawings.

Identical or functionally identical components are provided with the same designations in the figures.

DETAILED DESCRIPTION OF THE DRAWINGS

Figure 1:
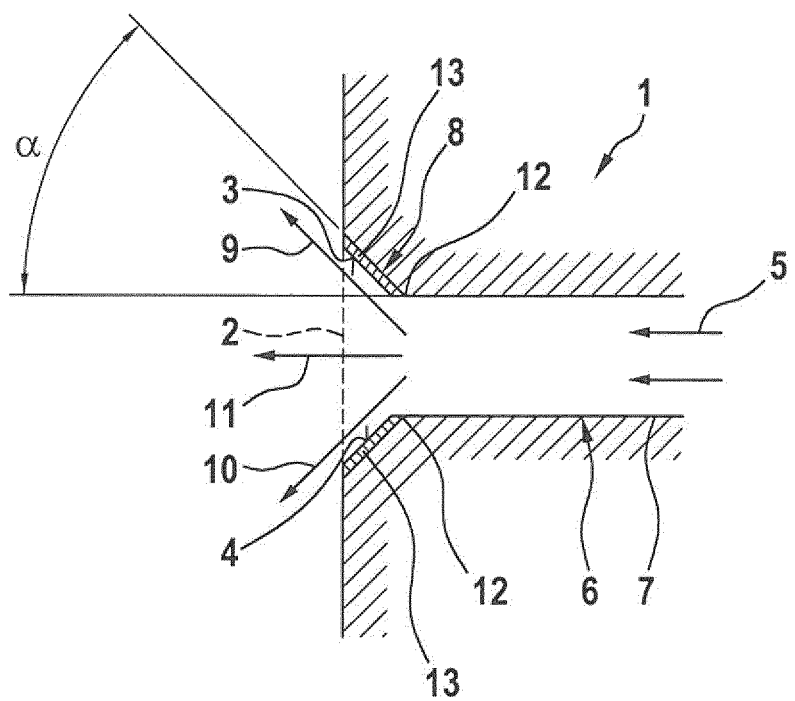
FIG. 1 is a diagrammatic sectional illustration of one exemplary embodiment for an air vent according to the invention.

FIG. 1 shows a diagrammatic sectional illustration of one exemplary embodiment for an air vent 1 according to the invention for the direct introduction of air into a passenger compartment of a vehicle (not shown).

The air vent 1 has an outlet opening 2 and two deflecting faces 3 and 4 which are arranged in the region of the outlet opening 2, run radially to the outside in each case with regard to a flow direction 5 of the air which flows in the direction of the respective deflecting faces 3 and 4, and by way of which in each case the air which flows in the direction of the respective deflecting faces 3 and 4 can be deflected radially to the outside with utilization of the Coanda effect. The deflecting faces 3 and 4 are arranged so as to lie opposite one another.

The air vent 1 has a flow duct 6 which has an inflow section 7 which can be connected to an air supply (not shown) and an outflow section 8 which is connected to the inflow section 7, adjoins the outflow opening 2, and on which the outflow opening 2 is arranged. Each deflecting face 3 and 4 is arranged on the outflow section 8 in such a way that the flow duct 6 is widened toward the outlet opening 2 in the region of the respective deflecting face 3 and 4.

A shape and an arrangement of each deflecting face 3 and 4 are adapted to a flow speed of the air which flows in the direction of the respective deflecting face 3 and 4 in such a way that it is equally probable whether the air which flows in the direction of the respective deflecting face 3 and 4 is deflected radially to the outside in accordance with the arrow 9 and 10 by way of the respective deflecting face 3 and 4 or is not deflected radially to the outside in accordance with the arrow 11. Each deflecting face 3 and 4 is of planar configuration and is connected via a radius 12 to the inflow section 7. The deflecting angle $\alpha$ lies between a minimum deflecting angle and a maximum deflecting angle, with the result that the above-described meta-stable state is configured as shown.

A single one of the flow directions (indicated by way of the arrows 9 to 11) of the air which flows out of the air vent 1 is set in a stable manner at the beginning of the operation of the air vent 1. If an object is moved into said air flow, the air flow jumps over, and a single one of the other flow directions (indicated by way of the arrows 9 to 11) of the air which flows out of the air vent 1 is set in a stable manner. Therefore, setting of the direction of the air which flows out of the air vent 1 is possible without mechanical air guiding elements.

Each deflecting face 3 and 4 is formed at least partially by a component 13 which is produced at least partially from an intelligent material in such a way that it changes its shape and, as a result, the shape of the respective deflecting face 3 and 4 if it is loaded with an electric voltage. As a result, the deflecting angle $\alpha$ and the respective radius 12 can be adapted in an optimum manner to the respective flow speed of the air which flows in the direction of the respective deflecting face 3 and 4.

Figure 2:
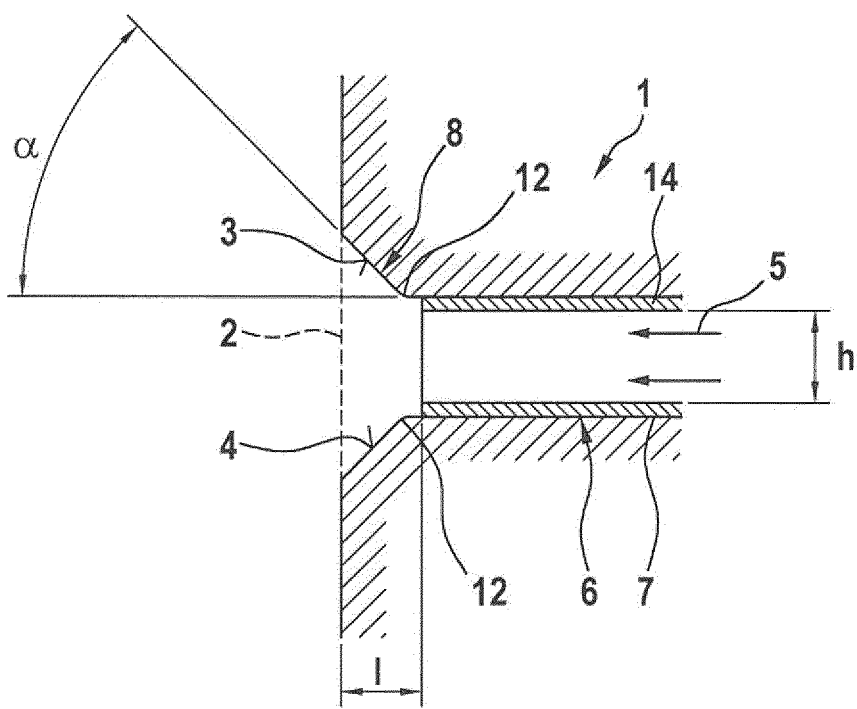
FIG. 2 is a diagrammatic sectional illustration of a further exemplary embodiment for an air vent according to the invention.

FIG. 2 shows a diagrammatic sectional illustration of a further exemplary embodiment for an air vent 1 according to the invention for the direct introduction of air into a passenger compartment of a vehicle (not shown).

The air vent 1 of FIG. 2 differs from the exemplary embodiment which is shown in FIG. 1 in that the deflecting faces 3 and 4 are not formed by an above-described component 13, and in that the flow duct 6 has an air duct 14 which is arranged longitudinally displaceably within the inflow section 7. The flow cross section of the air duct 14, which is indicated here by way of the height h, is variable. Otherwise, the air vent 1 corresponds to the exemplary embodiment which is shown in FIG. 1, for which reason reference is made to the above description of FIG. 1 in order to avoid repetitions.

The incident flow angle (not shown) is varied by way of a longitudinal displacement of the air duct 14, at which incident flow angle the air which exits from the air duct 14 flows onto the respective deflecting face 3 and 4. Depending on the incident flow angle, the air which flows in the direction of the respective deflecting face 3 and 4 is deflected radially to the outside to a different extent. The maximum deflecting angle $\alpha$ of the air which flows out of the air vent 1 becomes continuously greater up to a maximum value if the air duct 14 is pushed away from the outflow section 8, and becomes continuously smaller up to a minimum value if the air duct 14 is pushed in the direction of the outflow section 8. Therefore, the maximum deflecting angle $\alpha$ depends on the spacing l between the outflow opening 2 and that end of the air duct 14 which faces the outflow section 8. The flow speed of the air which flows in the direction of the deflecting faces 3 and 4 can be varied by way of a variation in the height h and/or the flow cross section of the air duct 14. The maximum deflecting angle $\alpha$ can also be varied in an infinitely variable manner as a result.

Figure 3:
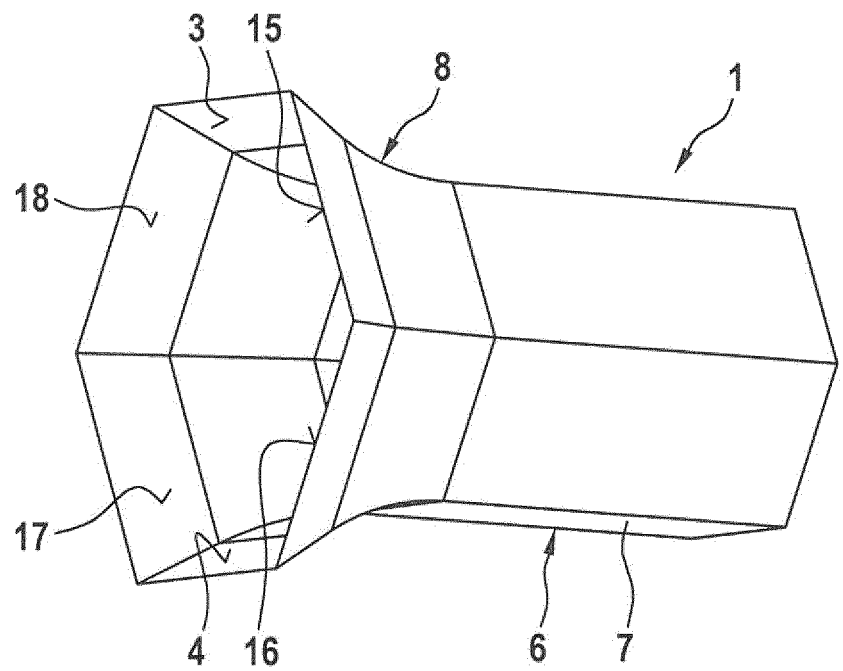
FIG. 3 is a diagrammatic and perspective illustration of a further exemplary embodiment for an air vent according to the invention.

FIG. 3 shows a diagrammatic and perspective illustration of a further exemplary embodiment for an air vent 1 according to the invention for the direct introduction of air into a passenger compartment of a vehicle. The flow duct 7 of the air vent 1 is of polygonal, in particular hexagonal, configuration in cross section. The deflecting faces 3, 4 and 15 to 18 are of convex configuration. In this way, a stable air jet which is not deflected via one of the deflecting faces 3, 4 and 15 to 18 and six deflected stable air jets can selectively be generated.

Figure 4:
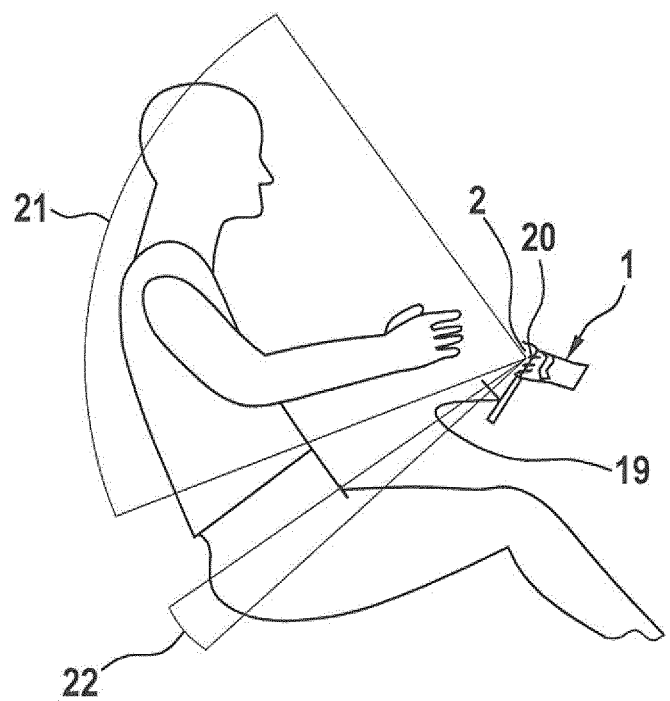
FIG. 4 is a diagrammatic illustration of a further exemplary embodiment for an air vent according to the invention.

FIG. 4 shows a diagrammatic illustration of a further exemplary embodiment for an air vent 1 according to the invention for the direct introduction of air into a passenger compartment of a vehicle.

The air vent 1 has an outlet opening 2 and a variably adjustable air guiding construction 20 which is arranged in the region of the outlet opening 2 and has louvers which are not shown in greater detail. Furthermore, the air vent 1 has a deflecting face 19 which is arranged in a lower region of the outlet opening 2 and runs radially to the outside with regard to a flow direction of the air which is guided in the direction of the deflecting face 19 by means of the air guiding construction 20 which is situated in a lower extreme position. A shape and an arrangement of the deflecting face 19 are adapted to a flow speed of the air which flows in the direction of the deflecting face 19 in such a way that the air which flows in the direction of the deflecting face 19 can be deflected radially to the outside by way of the deflecting face 19 with utilization of the Coanda effect. The air vent 1 is arranged on a decorative surface (not shown) of the vehicle.

The deflecting face 19 can be of at least partially convex or planar configuration. The deflecting face 19 can be formed at least partially by a component (not shown) which is produced at least partially from an intelligent material in such a way that it changes its shape and, as a result, the shape of the deflecting face 19 if it is loaded with an electric voltage.

In FIG. 4, a maximum deflecting region of the mechanical air guiding device 20 is denoted by the designation 21. A deflecting region, into which air which is deflected by means of the deflecting face 19 flows, is denoted by the designation 22. The deflecting region 22 is advantageous, in particular, in the case of a ventilation system of a cabriolet.

LIST OF DESIGNATIONS

1 Air vent
2 Outlet opening
3 Deflecting face
4 Deflecting face
5 Flow direction
6 Flow duct
7 Inflow section
8 Outflow section
9 Arrow
10 Arrow
11 Arrow
12 Radius
13 Component
14 Air duct
15 Deflecting face
16 Deflecting face
17 Deflecting face
18 Deflecting face
19 Deflecting face
20 Mechanical air guiding device
21 Deflecting region
22 Deflecting region
α Deflecting angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air vent for direct introduction of air into a passenger compartment of a vehicle, comprising:
   at least one outlet opening;
   at least one deflecting face which is arranged in a region of the outlet opening, runs radially to an outside with regard to a flow direction of air which flows in a direction of the outlet opening, and by way of which, air which flows in the direction of the outlet opening is deflectable radially to the outside with utilization of the Coanda effect, wherein
   a shape and arrangement of the deflecting face is adapted to different flow speeds of air which flows in the direction of the outlet opening to maintain a deflecting angle between a minimum deflecting angle and a maximum deflecting angle that configures a meta-stable state for all of said different flow speeds, wherein
   a deflecting angle smaller than the minimum deflecting angle exclusively deflects the air which flows in the direction of the outlet opening utilizing the Coanda effect, and
   a deflecting angle greater than the maximum deflecting angle causes no deflection of the air which flows in the direction of the outlet opening.

2. The air vent as claimed in claim 1, wherein
   the deflecting face is of at least partially convex or planar configuration.

3. The air vent as claimed in claim 1, wherein
   the deflecting face is formed at least partially by way of a component which is produced at least partially from an intelligent material such that the component's shape and, as a result, the shape of the deflecting face, change if the component is loaded with an electric voltage.

4. The air vent as claimed in claim 1, further comprising:
   at least one flow duct which has at least one inflow section which is connectable to an air supply and at least one outflow section which is connected to said at least one inflow section, adjoins the outflow opening, wherein the outflow opening is arranged on the at least one flow duct, wherein
   the deflecting face is arranged on the at least one outflow section such that the flow duct is widened toward the outlet opening in a region of the deflecting face.

5. An air vent for direct introduction of air into a passenger compartment of a vehicle, comprising:
   at least one outlet opening;
   at least one variably adjustable air guiding construction which is arranged in a region of the outlet opening; and
   at least one deflecting face which is arranged in the region of the outlet opening and runs radially to an outside with regard to a flow direction of air which is guided in a direction of the outlet opening by way of the air guiding construction which is terminally positioned toward the deflecting face, wherein
   a shape and arrangement of the deflecting face is adapted to different flow speeds of air which flows in the direction of the outlet opening to maintain a deflecting angle between a minimum deflecting angle and a maximum deflecting angle that configures a meta-stable state for said different flow speeds, wherein
   a deflecting angle smaller than the minimum deflecting angle exclusively deflects the air which flows in the direction of the outlet opening utilizing the Coanda effect, and
   a deflecting angle greater than the maximum deflecting angle causes no deflection of the air which flows in the direction of the outlet opening.

6. The air vent as claimed in claim 5, wherein the deflecting face is positioned downstream of the air guiding construction.

* * * * *